June 23, 1942.  E. G. PARTRIDGE  2,287,270

MOLD LUBRICANT AND METHOD OF MOLDING RUBBER ARTICLES

Filed July 5, 1940

Inventor
Edward G. Partridge
By Willis F. Avery
Atty.

Patented June 23, 1942

2,287,270

UNITED STATES PATENT OFFICE 2,287,270

MOLD LUBRICANT AND METHOD OF MOLD-ING RUBBER ARTICLES

Edward G. Partridge, Stow, Ohio, assignor to The B. F. Goodrich Company, New York, N. Y., a corporation of New York Application July 5, 1940, Serial No. 344,137

6 Claims. (Cl. 18—47)

This invention relates to a mold lubricant and to molding processes and especially to a method of molding rubber articles comprising component parts joined together to produce a unitary structure. In a preferred embodiment, the invention relates to a method of making golf ball cores with a one-piece rubber cover thereon.

The object of this invention is to provide a method of making rubber articles, and particularly golf ball cores, by semi-vulcanizing component parts of the article in a mold and then assembling the article and completing the vulcanization of the rubber under pressure. As a valuable part of this invention I have provided an improved mold lubricant that has the property, when applied to the mold, of preventing adhesion of the rubber to the mold and, in addition, any of the lubricant that adheres to the rubber is absorbed in the rubber in the subsequent vulcanization of the rubber, thereby producing a unitary one-piece rubber structure with no undesirable breaks at the areas of joinder.

This improved mold lubricant comprises zinc stearate, zinc oleate, ammonium stearate, ammonium oleate, and a minor proportion of zinc oxide and is preferably applied in the form of a suspension in water.

This invention is particularly useful in making cores for golf balls as the improved mold lubricant will not swell the rubber and, in addition, the lubricant adhering to the rubber is absorbed in the rubber. In the vulcanization of the core cover over the core pellet a unitary cover is obtained with no breaks at the seam. The best core pellet for a golf ball is a viscous liquid and because of this absence of breaks in the seam there is no danger of the liquid portion of the core leaking out into the windings around the core.

Figure 1:
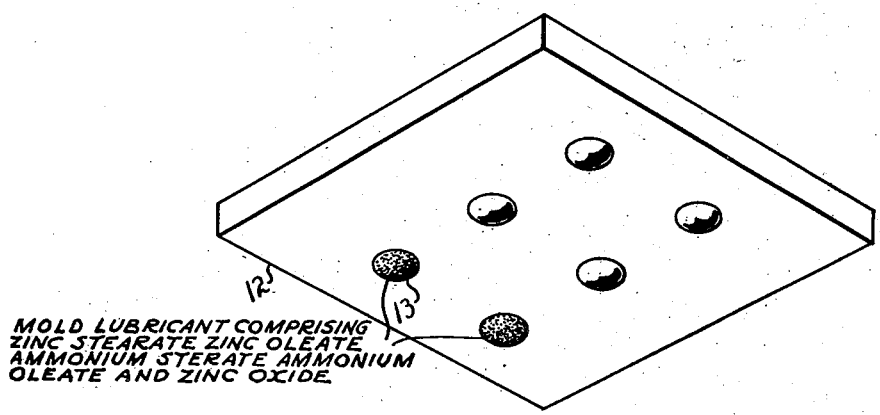
Figure 2:
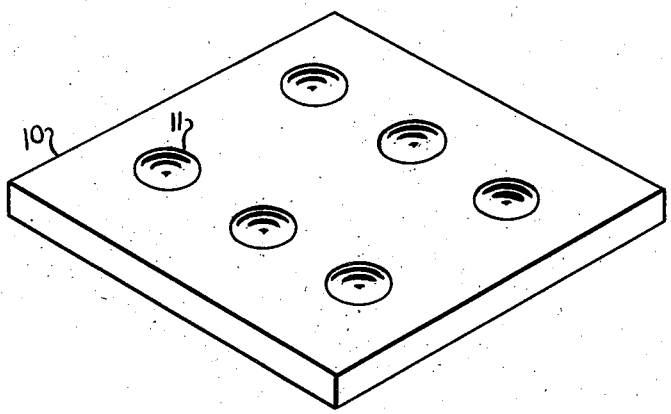
Figure 2:
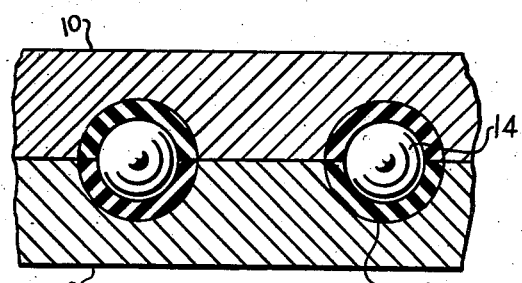

This invention may be illustrated by the accompanying drawing which shows a particular method of using the mold lubricant of this invention, and of which Fig. 1 is a perspective view of a mold plate and a mold cover plate for making hemispherical covers for golf ball cores;

Fig. 2 is a cross-sectional elevation of a portion of a mold for making golf-ball cores with cores being molded therein.

In a practical embodiment of this invention I provide a mold plate 10 containing a number of hemispherical-shaped indentations 11 therein and a cover plate 12 with a number of round-headed pins 13 so arranged that the pins 13 on the cover plate 12 fit the hemispherical indentations 11 but with a substantial clearance remaining between the surface of each pin and the surface of its corresponding indentation. A vulcanizable rubber composition is placed in the indentation 11 in the mold plate 10, the cover plate 12 is coated with the improved mold lubricant of this invention, which is a suspension of zinc stearate, zinc oleate, ammonium stearate, ammonium oleate, and a minor proportion of zinc oxide, in water, and the mold is closed and the rubber is partially vulcanized by the application of heat insufficient to completely vulcanize the rubber. The mold is then opened. Because of the mold lubricant on the cover plate, the plate comes off leaving hemispherical rubber shells in the indentations in the mold plate. A core pellet 14 is placed in the semi-vulcanized rubber shells and another mold plate containing similar rubber shells is positioned over the first one so that each pellet is covered by a rubber shell. Pressure is applied and the rubber is completely vulcanized by the application of heat. In this last operation mold lubricant adhering to the rubber is absorbed in the rubber and a unitary rubber core cover 15 is produced over the core pellets 14. By this method an integral golf ball core is produced consisting of a core pellet completely enclosed in a unitary rubber core cover.

The improved mold lubricant of this invention may be made by reacting stearic acid, zinc oxide, oleic acid, and aqua ammonia in a reaction vessel. The zinc oxide should be present in slight excess in the reacting mixture so that there will be some free zinc oxide remaining in the products of the reaction. The mold lubricant is made into a dispersion by adding water and heating. A convenient way of making the lubricant is to mix 4 lbs. of a wetting agent, such as sodium lauryl sulfate, 77 pounds of stearic acid flakes, preferably melted, 22 pounds of zinc oxide, 92 pounds of oleic acid, 65 pounds of 29% aqua ammonia, and 558 pounds of water, in a steam-jacketed power-driven churn. The contents are heated with steam at 225° F. The contents of the churn are agitated at the above temperature until a smooth paste of uniform consistency is obtained. This recipe makes about 100 gallons or 818 pounds of the paste and this paste should be dispersed in an equal volume of water to render it sufficiently fluid to be easily applied to a mold surface.

This invention can be used to make any rubber article by the method of partially vulcanizing component parts of the article in a mold coated with the improved mold lubricant of this invention, assembling these component parts, and completing the vulcanization under pressure to produce the finished article. The mold lubricant of this invention is not limited to making this particular type of rubber article, however, but may be used in making a wide variety of ordinary molded rubber articles by any of the conventional methods. It is accordingly intended to protect the invention broadly, unlimited by any particular embodiment of the same, within the spirit and scope of the appended claims.

I claim:

1. A mold lubricant for use in making molded rubber articles or the like, comprising zinc stearate, zinc oleate, ammonium stearate, ammonium oleate, and zinc oxide.

2. The method of making a mold lubricant comprising mixing stearic acid, oleic acid, zinc oxide, aqua ammonia, and water, and reacting the mixture under the application of heat.

3. The method of making a rubber article which comprises vulcanizing a vulcanizable rubber compound in a mold coated with a mold lubricant comprising zinc stearate, zinc oleate, ammonium stearate, ammonium oleate, and zinc oxide.

4. The method of making a joined rubber article which comprises semi-vulcanizing two or more component parts of the article in a mold coated with a mold lubricant comprising zinc stearate, zinc oleate, ammonium stearate, ammonium oleate, and zinc oxide, assembling the component parts, and completing the vulcanization under pressure, whereby the mold lubricant adhering to the rubber is absorbed in the rubber and a unitary structure is obtained.

5. The method of making a spherical rubber ball comprising two joined hemispherical halves of vulcanized rubber which comprises semi-vulcanizing the two hemispheres in a shaped mold coated with a mold lubricant comprising zinc stearate, zinc oleate, ammonium stearate, ammonium oleate, and zinc oxide, placing the planar areas of the two hemispheres together and completing the vulcanization of the rubber under pressure, whereby the mold lubricant adhering to the rubber is absorbed in the rubber and a unitary spherical structure is obtained.

6. The method of making a joined rubber article which comprises semi-vulcanizing two or more component parts of the article in a mold coated with a mold lubricant comprising zinc stearate, assembling the semi-vulcanized component parts, and completing the vulcanization of the assembled structure under pressure, whereby the mold lubricant adhering to the rubber is absorbed in the rubber and a unitary structure is obtained.

EDWARD G. PARTRIDGE.